Patented Nov. 20, 1934

1,981,126

UNITED STATES PATENT OFFICE 1,981,126

DECOMPOSITION OF RARE EARTH METAL BEARING ORES

Rudolf Schulze, Bitterfeld, Germany, assignor to I. G. Farbenindustrie Aktiengesellschaft, Frankfort-on-the-Main, Germany No Drawing. Application April 8, 1933, Serial No. 665,191. In Germany April 25, 1932

5 Claims. (Cl. 23—16)

The present invention relates to improvements in the decomposition of rare earth metal bearing ores, and particularly of monazite.

In order to obtain compounds which are soluble in hydrochloric acid by decomposition of monazite, in which the rare earth metals are substantially present in the form of phosphates, various methods have been suggested, all of which, however, are attended with grave disadvantages. Thus it has been suggested to perform the reduction in an electric furnace with the addition of silica. Under the conditions then prevailing, silicates of the rare earth metals are formed along with elementary phosphorus, and it thus becomes necessary to evaporate the solution obtained by treating the smelt with hydrochloric acid to dryness, in order to remove the silicic acid before further proceeding in the working up.

The present invention aims at decomposing monazite by means of carbon in such a manner that the rare earth metals are obtained in the form of lime and/or magnesium compounds which are soluble in hydrochloric acid and are entirely free from phosphorus. It has been observed that reduction with an excess of carbon in an electric furnace in order to convert the rare earth metal compounds into carbides, either with or without an addition of lime generally does not lead to a complete elimination of the phosphorus present: the carbides thus obtained are contaminated with phosphides which, when treated with acids, yield self-igniting phosphoretted hydrogen; moreover the consumption of carbon is excessively high.

In order to obviate these difficulties it is necessary to maintain certain conditions of working so as to suppress the formation of phosphide compounds which might give rise, on treatment with acids, to the formation of phosphoretted hydrogen, in a reliable manner.

According to the present invention, a mixture of monazite and carbon with the addition of calcium and/or magnesium oxide or oxide yielding compounds such as the corresponding carbonates is heated to high temperatures and, in order to prevent the formation of phosphides, the quantity of carbon employed in the reaction is so limited that it is only just sufficient to bring about reduction of the phosphoric acid contained in the monazite to elementary phosphorus while at the same time the quantity of calcium and/or magnesium oxide is so calculated that not more than about three mols of these oxides are present for every single mol of oxides of the rare earth metals. When working in this manner, if any, only traces of carbides and phosphides are formed, the rare earth metals after decomposition of the phosphates instead being converted into compounds which have a composition analogous to that of the well known calcium aluminates. In these compounds, which are easily soluble in hydrochloric acid, the rare earth metal oxides take the place of the alumina in calcium aluminate.

The reduction of the phosphates sets in already at about 1400° C. with rather considerable velocity and at about 1500° C. leads to the total elimination of the phosphorus. Since at these temperatures the compounds formed by interaction of the rare earth metal oxides with calcium and/or magnesium oxide represent masses which are only loosely sintered, it is possible to perform the process in a rotary furnace if desired. When however, the temperature is raised to between about 1650° and about 1750° C. the reaction is accelerated and easily fusible melts are obtained, so that a continuous working in an electric furnace becomes possible. The fused compounds, on cooling, yield hard and solid masses having a well-defined crystal structure, and in order to simplify subsequent disintegration of the latter it is advantageous to granulate the slag by running it into water and then to grind it.

The further working up of the slag products obtained according to the invention is preferably carried out by dissolving them in hydrochloric acid and working up the filtered solution in known manner with a view of separating the thorium or the total group of rare earth metals, as the case may be, or in the manner described in my copending application Ser. No. 660,305 filed Mar. 10, 1933 and entitled "Improvements in treating rare-earth metal compounds" by precipitating the hydrated chlorides of the cerium group from such solution by the addition of hydrochloric acid and/or easily soluble chlorides such as calcium chloride, if necessary while cooling.

In the decomposition of the monazite also the other oxides of the alkaline earth metals namely strontium or barium oxide may be employed instead or along with calcium and/or magnesium oxide.

Example 100 kgs. of finely ground monazite sand (containing 65.8 percent of oxides of the rare earth metals, namely: 56 percent of oxides of the cerium group, 3 percent of oxides of the yttrium group and 6.8 percent of oxides of the thorium group, 26,2 percent of $P_2O_5$ and 7.1 percent of gangue) are mixed with 13 kgs. of burnt lime stone (85 percent of CaO) and 14 kgs. of a fine grade coke with a low ash content and the mixture is fused in an electric furnace until the phosphorus content which amounts to about 11 kgs. is practically volatilized. The molten slag is granulated by running into water and thereupon dissolved while stirring in 200 kgs. of 30 percent hydrochloric acid. After removal of the undissolved matter the solution contains about 95 percent of the earth metal oxides.

I claim:—

1. A process of decomposing phosphate compounds of the rare earth metals which comprises subjecting such compounds to reduction with carbon in the presence of at least one oxide compound of the alkaline earth metals including magnesium oxide, so as to volatilize elementary phosphorus, the quantity of carbon being sufficient only for reducing the phosphates present to phosphorus and the quantity of alkaline earth metal oxides not exceeding about three molecules of alkaline earth metal oxide for every molecule of rare earth metal oxide.

2. A process of decomposing phosphate compounds of the rare earth metals which comprises subjecting such compounds to reduction with carbon in the presence of at least one oxide compound of the alkaline earth metals including magnesium oxide, so as to volatilize elementary phosphorus, the quantity of carbon being sufficient only for reducing the phosphates present to phosphorus and the quantity of alkaline earth metal oxides being so adjusted as to cause, in combination with the rare earth metal oxides present, the formation of compounds similar to alkaline earth metal aluminates, in which the rare earth metals take the place of the alumina.

3. A process of decomposing phosphate compounds of the rare earth metals which comprises subjecting such compounds to reduction with carbon at sintering temperatures in the presence of at least one oxide compound of the alkaline earth metals including magnesium oxide so as to volatilize elementary phosphorus, the quantity of carbon being sufficient only for reducing the phosphates present to phosphorus and the quantity of alkaline earth metal oxides not exceeding about three molecules of alkaline earth metal oxide for every molecule of rare earth metal oxide.

4. A process of decomposing phosphate compounds of the rare earth metals which comprises subjecting such compounds to reduction with carbon at melting temperatures in the presence of at least one oxide compound of the alkaline earth metals including magnesium oxide, so as to volatilize elementary phosphorus, the quantity of carbon being sufficient only for reducing the phosphates present to phosphorus and the quantity of alkaline earth metal oxides not exceeding about three molecules of alkaline earth metal oxides for every molecule of rare earth metal oxide, running the melt into water so as to cause granulation, disintegrating the granulated melt and subjecting it to treatment with hydrochloric acid.

5. A process according to claim 1, in which elementary phosphorus is recovered from the reaction gases, and a slag containing the rare earth metal oxides and substantially free from phosphorus is obtained.

RUDOLF SCHULZE.